(12) United States Patent
Van Os et al.

(10) Patent No.: US 11,917,107 B2
(45) Date of Patent: *Feb. 27, 2024

(54) SYSTEM AND METHOD FOR PROCESSING VOICEMAIL

(71) Applicant: Apple Inc., Cupertino, CA (US)

(72) Inventors: Marcel Van Os, San Francisco, CA (US); Gregory B. Novick, San Francisco, CA (US); Scott M. Herz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,102

(22) Filed: Jul. 12, 2022

(65) Prior Publication Data

US 2023/0216963 A1    Jul. 6, 2023

Related U.S. Application Data

(60) Division of application No. 16/872,319, filed on May 11, 2020, now Pat. No. 11,388,291, which is a continuation of application No. 14/213,241, filed on Mar. 14, 2014, now Pat. No. 10,652,394.

(60) Provisional application No. 61/783,984, filed on Mar. 14, 2013.

(51) Int. Cl.
   *H04M 3/533*    (2006.01)

(52) U.S. Cl.
   CPC ....... *H04M 3/533* (2013.01); *H04M 3/53333* (2013.01)

(58) Field of Classification Search
   CPC .............. G10L 2015/088; G10L 15/26; H04M 2201/40; H04M 1/271; H04M 3/533; H04M 1/7255; H04M 2250/74; H04M 1/274516
   USPC ............ 455/412.1, 412.2, 413, 414.1, 556.1, 455/556.2
   See application file for complete search history.

(56) References Cited

U.S. PATENT DOCUMENTS

| | | | |
|---|---|---|---|
| 2004/0198329 A1* | 10/2004 | Vasa ................... | H04M 3/4931 455/418 |
| 2006/0056320 A1* | 3/2006 | Gatts ....................... | H04L 69/08 370/276 |
| 2007/0026852 A1* | 2/2007 | Logan ............... | H04M 1/72445 455/422.1 |
| 2008/0112553 A1* | 5/2008 | Chen ..................... | H04M 15/06 379/142.06 |
| 2011/0214149 A1* | 9/2011 | Schlacht .......... | H04N 21/47214 725/99 |

(Continued)

*Primary Examiner* — Jean A Gelin
(74) *Attorney, Agent, or Firm* — DLA Piper LLP (US)

(57) ABSTRACT

In one example, a recorded voicemail is first converted from speech to text, and a proposed action to be performed by the user is extracted from the voice message. For example, in the voicemail "this is John, call me at 650.987.0987 at 9 am tomorrow," the action is to call John. At least one action parameter for undertaking the action is determined. For example, the action parameters may include the 650.987.0987 telephone number and the 9 am time the following morning, The at least one action parameter may be extracted from the voicemail message or it may be determined by other means, e.g., from a user's contact book. Finally, the user is presented with a prompt to facilitate undertaking the action using the at least one the parameter. For example, the user may be given the option to set a reminder to call John the following morning at 9 am.

51 Claims, 9 Drawing Sheets

(56) References Cited

U.S. PATENT DOCUMENTS

| | | | | |
|---|---|---|---|---|
| 2013/0130669 A1* | 5/2013 | Xiao | ................ | H04M 1/72457 |
| | | | | 455/418 |
| 2014/0273974 A1* | 9/2014 | Varghese | .............. | H04W 88/06 |
| | | | | 455/552.1 |
| 2021/0144251 A1* | 5/2021 | Chen | .................... | H04M 3/527 |

* cited by examiner

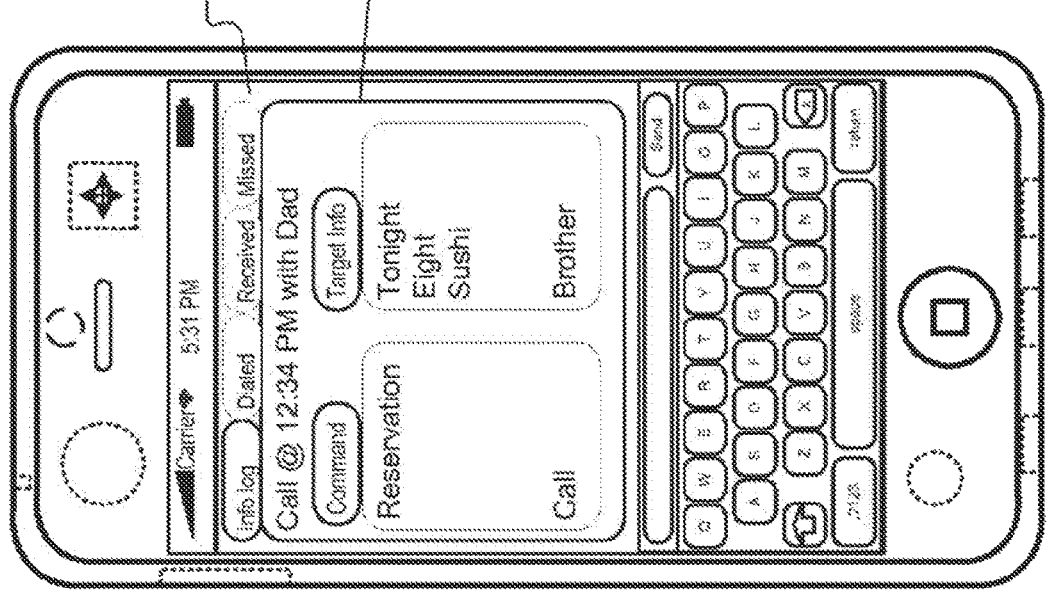
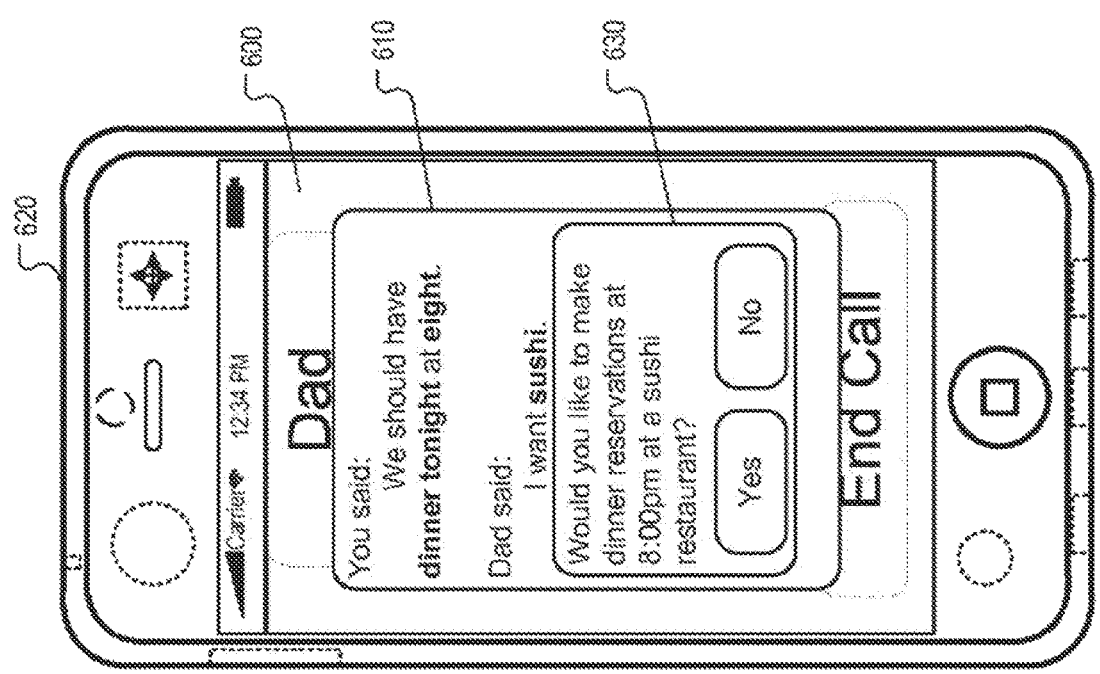
Fig. 6A
Fig. 6B

SYSTEM AND METHOD FOR PROCESSING VOICEMAIL

CROSS-REFERENCE TO RELATED APPLICATIONS

This application is a continuation of U.S. application Ser. No. 16/872,319, filed on May 11, 2020, entitled SYSTEM AND METHOD FOR PROCESSING VOICEMAIL, which is a continuation of U.S. application Ser. No. 14/213,241, filed on Mar. 14, 2014, entitled SYSTEM AND METHOD FOR PROCESSING VOICEMAIL, which claims the benefit of U.S. Provisional Application No. 61/783,984, filed on Mar. 14, 2013, entitled SYSTEM AND METHOD FOR PROCESSING VOICEMAIL, which is hereby incorporated by reference in its entity for all purposes.

This application is related to U.S. patent application Ser. No. 12/794,650, and U.S. Provisional Patent Application No. 61/184,717, entitled SMART DEDUCTION OF VOICE COMMANDS, filed Jun. 5, 2009, which are both hereby incorporated by reference in their entireties and for all purposes.

TECHNICAL FIELD

The subject matter described herein relates to systems and methods for automatically recognizing and acting on the content of voicemail messages.

BACKGROUND

Most modern cellular telephone carriers offer a voicemail service. Conventional voicemail, however, is cumbersome to use, especially when a user needs to extract and/or act on information contained in a voicemail message. For example, if a user receives a voicemail message, and the user needs to extract and act on information contained in a voicemail message, the user needs to perform numerous steps to deal with the message. For example, if a caller leaves a voicemail message asking the user to email the caller a copy of a presentation that the user gave the day before, the user must first listen to the voicemail message; open an email application; locate the email address of the caller; attach the presentation to the email; and then send the email to the caller. This process is inefficient and time consuming. Accordingly, it would be desirable to have an automated system perform as many of these tasks as possible.

SUMMARY

According to some implementations there is provided a method of operating a digital assistant. The method occurs at a device having one or more processors and memory, such as at a mobile telephone. A recorded voice message is provided from a caller to a user. For example a caller leaves a voicemail message for the user of the mobile device. In some embodiments, the recorder voicemail is first converted from speech to text.

A proposed action to be performed by the user is then extracted from the voice message. For example, the voicemail may state "this is John, call me at 650.987.0987 at 9 am tomorrow." Here, the action is to call John.

At least one action parameter for undertaking the action is determined. Using the same example, the at least one action parameter includes (i) the telephone number of 650.987.0987, and 9 am the following morning. The at least one action parameter may be extracted from the voicemail message or it may be determined by other means. For example, the caller's telephone number may be obtained from caller identification, or by looking-up the caller's telephone number in the user's contact book.

Finally, the user is presented with a prompt to facilitate undertaking the action using the at least one the parameter. For example, the user may be given the option to set a reminder to call John the following morning at 9 am.

Some implementations provide a non-transitory computer-readable storage medium storing one or more programs for execution by the one or more processors. The one or more programs comprise instructions for performing the methods described herein.

Finally, some implementations provide a mobile or cellular telephone that includes a processor and memory coupled to the processor. The memory includes instructions for performing the methods described herein.

In some implementations, many or all of these steps occur automatically without user intervention.

The automatic processing of incoming voicemail messages realizes one or more of the following potential advantages. First, it reduces or eliminates the user having to remember, write down or type in contacts details left by callers in voicemail messages. Second, it provides a useful and convenient mechanism for users to process and respond to incoming voicemail messages. Accordingly, automatic processing of incoming voicemail messages saves the user time and effort, and greatly improves the efficiency of responding to or acting on information contained in received voicemail messages.

Details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6A is a screenshot that includes an example user interface.

FIG. 6B is a screenshot that includes another example user interface. Like reference numbers and designations in the various drawings indicate like elements.

DETAILED DESCRIPTION

Figure 1:
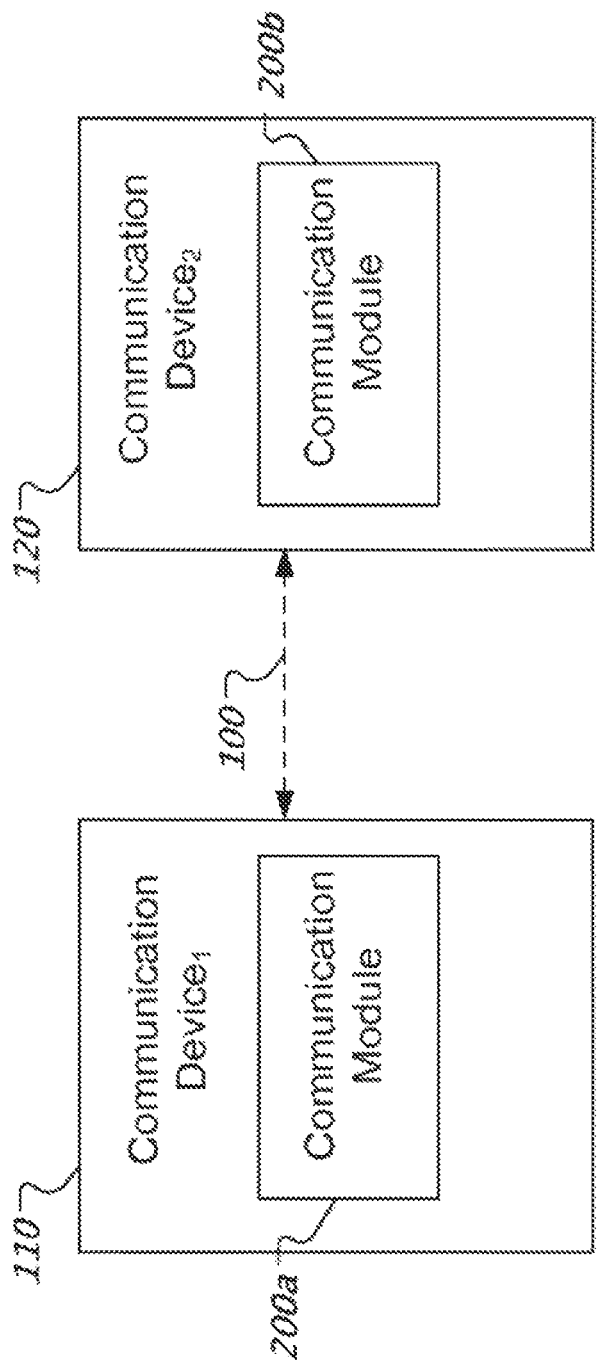
FIG. 1 is a block diagram illustrating example communication devices.

FIG. 1 is a block diagram illustrating example communication devices 110 and 120. The communication devices 110 and 120 can each be configured to receive and transmit data using a communication channel 100, e.g., an electronic channel such as a channel in a wired or wireless network. As an example, the communication devices 110 and 120 can receive and transmit digital audio signals over a multi-media broadband network. The communication devices 110 and 120 can connect over the communication channel 100 automatically, or in response to user input requesting a connection. For example, a first user operating the communication device 110 can input a second user's phone number to establish a connection with the communication device 120 operated by a second user. The communication devices 110 and 120 can receive and transmit multimedia data, including video content, audio content, image content, textual content, or any combination thereof over the communication channel 100.

In some implementations, a communication device is a physical device implemented as hardware and configured to operate a software program. In some alternative implementations, a communication device is a virtual device that is implemented as a software application or module that is configured to establish a connection with another communication device. As examples, the communication devices 110 and 120 can be or be implemented as software in a mobile phone, personal digital assistant, portable computer, desktop computer, or other electronic communication device. Examples of communication channels 100 include Internet Protocol-based networks, cellular telephone networks, satellite networks, and other communication networks. Note that one or more other communication devices, in addition to the communication devices 110 and 120, can be connected over the communication channel 100.

The communication devices 110 and 120 can communicate in real-time or near real-time over the communication channel 100. For example, a real-time communication session, such as a phone conversation, can be conducted using two or more communication devices. In addition, a communication session can be established using voice-over Internet Protocol full duplex communications. The communication devices 110 and 120 can be implemented to permit full duplex conversations that include any electronically assisted communication mechanism or channel, e.g., over a mobile broadband network. The bidirectional nature of the communication devices 110 and 120 can enable two or more users to simultaneously exchange voice information during a communication session, e.g., a phone call. Voice information corresponds to the voice communication, e.g., conversation, between the parties to the communication session.

A communication device can include a communication module. In FIG. 1, communication device 110 includes a communication module 200a, and communication device 120 includes a communication module 200b. A communication module (e.g., communication module 200a, communication module 200b) can be configured to process audio data, e.g., digital audio data, received from a communication device. For example, the communication module can process audio data communicated: by a user operating the communication device 110; in a voicemail message; and from an interactive voice response device. The communication module can be located internal or external to a communication device. In some implementations, the communication module can be implemented in hardware and configured to operate a software program. In some alternative implementations, the communication module is a software application or module that is configured to process digital audio data. The communication module can also be configured to process commands received from a user through a microphone operatively coupled to the communication device in which the communication module is located.

Figure 2:
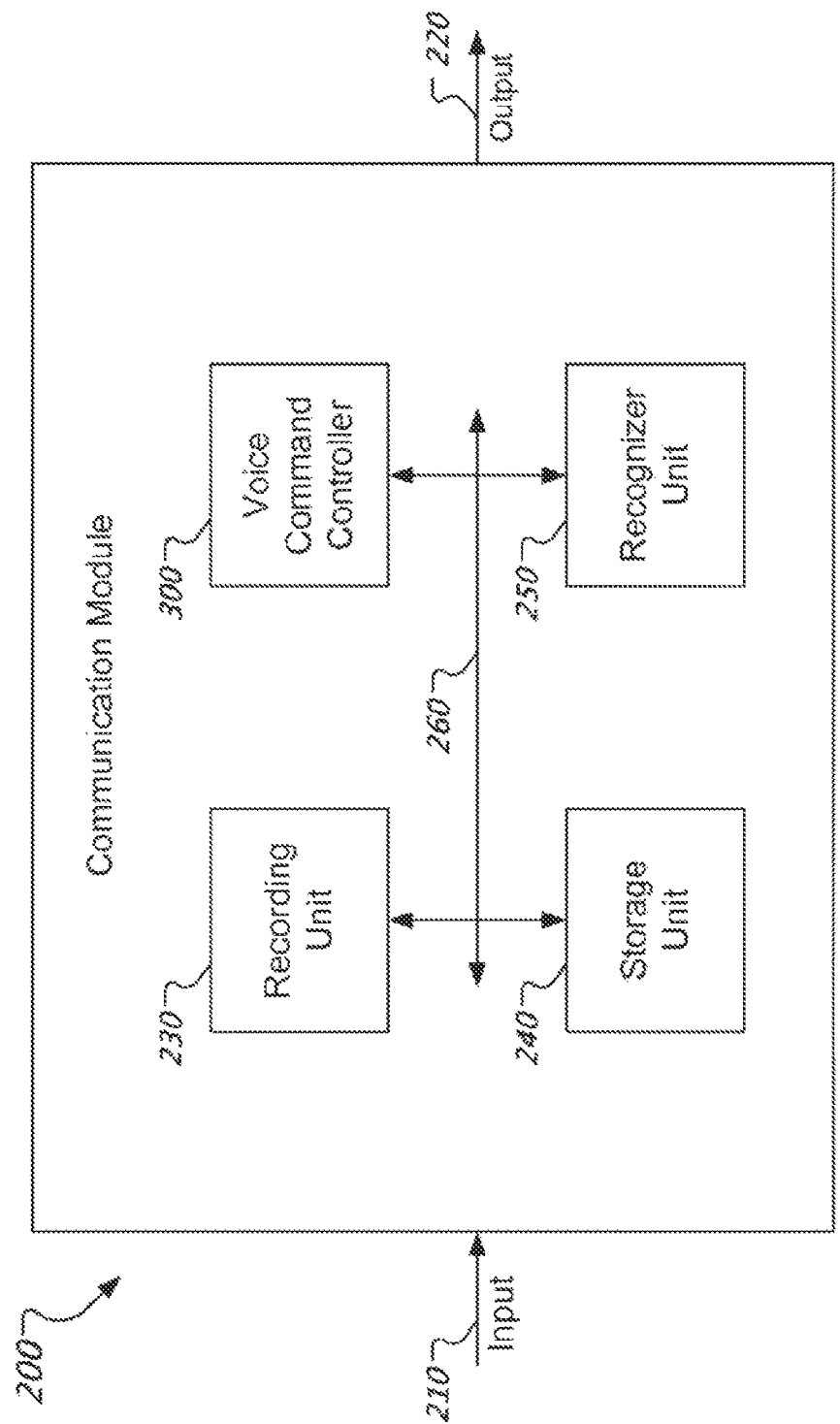
FIG. 2 is a block diagram illustrating an example communication module.

FIG. 2 is a block diagram illustrating an example communication module 200. The communication module 200 includes a recording unit 230, a storage unit 240, a recognizer unit 250, and a voice command controller 300. These functions performed by these components can be combined or subdivided into components in ways other than those shown in FIG. 2. In addition, these components can be implemented in hardware and configured to operate a software program, or can be implemented as a software application or module.

Each of the components 230, 240, 250, and 300 can be interconnected, for example, using a data communication link 260. The communication module 200 can receive input 210 and produce output 220. The received input 210 can be audio data, e.g., in the form of digital or analog audio signals. For example, the communication module 200 can receive voice information input 210 encoded in a digital audio signal. The output 220 can include audio data, visual data, textual data, or any combination thereof. The output 220 can be displayed graphically in a display screen, or a user interface provided by a software application running on the communication device. For example, the communication module 200 can generate textual data output corresponding to the received digital audio signals and can display the textual data output in a display, e.g., a touch screen display of a smart phone. In some implementations, one or more of the communication module components 230, 240, 250, and 300 are located external to the communication device in which the communication module is located. The recording unit 230 records audio data. The audio data can include both received and transmitted voice information.

The recording unit 230 can be implemented to record a communication session between two or more communication devices. For example, the recording unit 230 can record a portion, or the entirety, of a phone conversation between two users communicating with mobile phones.

The recording unit 230 can be configured, e.g., by setting user preferences, to record voice information originating from one or more participants, e.g., callers using different communication devices, of a communication session. In some implementations, user preferences are used to select one or more particular participants for which voice information is recorded by the recording unit 230.

As an example, the recording unit 230 can be configured to record only one side of the phone conversation. The recording unit 230 can be configured to capture voice information spoken only by a first caller on a far end of a phone call and not by a second caller on a near end. The first caller on the far end is a caller using a first communication device that is exchanging voice information during a communication session with a second caller using a second communication device. The second caller on the near end is a caller using the second communication device in which the recording unit 230 is located. Alternatively, the recording unit 230 can capture voice information spoken only by the second caller on the near end.

In some implementations, the recording unit 230 automatically records the communication session. In some implementations, the recording unit 230 records the communication session in response to user input. For example, the recording unit 230 can continuously record one or more sides of a conversation in response to a user pressing a hardware button, a virtual button, or a soft record button, or issuing a voice command.

In these and other implementations, the communication module 200 can provide a notification to each participant of which voice information is being recorded. The notification can be a visual notification displayed in a display of the communication module of each participant, or an audio notification played by the communication module of each participant. In FIG. 2, the communication module 200, e.g., the recording unit 230, can produce an output 220, such as an audible, visual or textual indicator notifying the caller on the far end, the near end, or both, that the conversation is being recorded.

In some implementations, the recording unit 230 determines an identifier that indicates a date and time, e.g., a time stamp, associated with the recorded audio data. In addition, the recording unit 230 can associate the recorded audio data with one or more other identifiers. Examples of identifiers include an identifier for a particular communication session, a particular communication device, or a particular user of a communication device, from which the recorded audio data was derived. The identifiers can be used to identify particular recorded audio data for processing.

The storage unit 240 can be implemented to store data, e.g., the recorded audio data. The storage unit 240 can receive audio data captured by the recording unit 230. For example, the storage unit 240 can store audio data and information associated with the audio data, e.g., the identifiers described above. The storage unit 240 can be implemented as a local storage device or local memory cache. In some implementations, the storage unit 240 is located external to both the communication module 200 and the communication device 120. For example, the storage unit 240 can reside in a server, e.g., a network device, located remotely from the communication device 120. Audio data stored at the storage unit 240 can be played back. Additionally, audio data stored at the storage unit 240 can be transcoded into textual data and can be provided as output 220.

The recognizer unit 250 can be implemented to automatically identify terms, e.g., identify without further user intervention one or more words, in the audio data received from a remote source, such as the communication device 110. In some implementations, the recognizer unit 250 uses conventional techniques and one or more language models to identify key words, e.g., part of speech, subject-verb-object word order (e.g., identifying declarative sentences) in the audio data. The recognizer unit 250 provides the key words as input to an application or service external to the communication module. As an example, the following conversation may occur:

User 1: "We should have dinner tonight at eight."
User 2: "I want sushi."[

The recognizer unit 250 can identify the key words "dinner", "eight", and "sushi". Furthermore, the recognizer unit 250 can work with a location based service to determine a geographical location of one or more of the communication devices being used by the users in the communication session. The recognizer unit 250 can determine that, based on the detected key words, that a restaurant reservation service (e.g., a web application that makes restaurant reservations) may be useful for the user.

In some implementations, the recognizer unit 250 sends the input to a suggestion service external to the communication device that makes this type of determination. In some implementations, pattern matching can be used to identify the terms. An example pattern for a term representing a city, state, and zip code is "City, State', where N is a digit. An example pattern for a term representing an address is "X Y Drive", where X is a number and Y is one or more words associated with the name of the drive. An example pattern for a term representing a phone number is "NNN NNN NNNN', where N is a digit. Other patterns are possible.

In some implementations, the communication module 200 provides a notification to the user that the particular key words were detected and provide suggestions on how to act on the key words. For example, the communication module can provide visual feedback in the screen of the communication device that asks, "Would you like to make dinner reservations at 8:00 pm at a sushi restaurant?". In some implementations, the communication module 200 automatically provides, e.g., without further user intervention, the key words to an application or service external to the communication module. In the example, the communication module may work with a restaurant reservation service to generate a request for the reservation. In particular, the communication may initiate, at the restaurant reservation service, a request to search for sushi restaurants with reservations available at 8:00 pm in a predetermined proximity to the geographical location (e.g., within 10 miles).

Other implementations are possible. For example, the recognizer unit 250 can send the input to applications or services local or external to the communication device, e.g., email applications, web browsers, and work with the local applications or services to provide a suggested operation or automatically initiate a subsequent action, e.g., generate a draft email, request a particular web page.

In some implementations, the recognizer unit 250 can identify the terms as being commands, e.g., voice commands, or target information, e.g., information upon which a command operates or performs an action. Upon detecting a command and target information, the recognizer unit 250 can provide the command and target information as output 220 (e.g., audible, visual, textual output) indicating to the user of the communication device that the command and target information were detected, and request instructions from the user whether to store the command and target information in an information log.

The commands and target information can be detected by the recognizer unit 250 using various techniques. In some implementations, the recognizer unit 250 identifies commands by comparing terms in the audio data to a collection of terms specified as being commands, e.g., in a dictionary of commands. In some implementations, the recognizer unit 250 uses conventional techniques and one or more language models to identify commands and target information based on linguistics, e.g., part of speech, subject-verb-object word order (e.g., identifying declarative sentences). In these and other implementations, pattern matching can also be used to identify commands and target information. For example, a predetermined number of tokens, e.g., characters or words that follow a detected command can be identified as being target information.

As an example, the recognizer unit 250 can be configured to identify, in the audio data received from the remote source, the term "phone number" as being a command and the next ten numerals following the words "phone number" as being target information. Upon identifying the term "phone number," the recognizer unit 250 can be implemented to produce any of audible, visual, and textual output 220, indicating that the ten numerals associated with the words "phone number" have been recognized. The audio data from the remote source can be monitored by the recognizer unit 250 during any portion of the communication session. For example, the recognizer unit 250 can be implemented to continuously monitor spoken voice information transmitted from one or more communication devices during a phone conversation.

In some implementations, the recognizer unit 250 can detect key words in the audio data and send portions of the audio data associated with the detected key words to a recognizer service external to the communication device, e.g., a recognizer service located on a server device. The key words can be specified, for example, in a dictionary of key words. The portion of the audio data can be defined, for example, based on an amount of time before the key word occurs in the corresponding audio and an amount of time after the key word occurs, e.g., a portion of audio data that corresponds to the audio from seconds before the key word occurs to seconds after the key word occurs. The recognizer service can determine commands and target information and provide the commands and target information to the recognizer unit 250.

In some implementations, the recognizer unit 250 can generate an information log based on the identified terms, e.g., identified commands and target information, key words. In some implementations, the information log is a list or queue of information items (e.g., commands and target information) recognized during a communication session. When an information item is detected, the item of information can be added to the information log.

Additional information also can be associated with the item of information, such as a time stamp and/or an indication of the item's source, e.g., an identifier of a user or a communication device. The information log can be displayed, e.g., in a user interface of a communication device.

In some implementations, the communication module 200 provides a notification to a user of the communication device, e.g., a tone or haptic feedback, when a new information item is added to the information log. Once added to the information log, an item of information can be acted on. For example, a phone number recognized during a communication session and added to the information log can be dialed during the communication session, such as to initiate a three-way call. Also, an e-mail address can be accessed to generate a message or message template during the communication session.

The information log also can be accessed after the corresponding communication session ends. For example, a recognized telephone number can be used to initiate a new communication session or an item of contact information can be used to generate a new contact or update an existing contact. One or more items of information included in the information log also can be altered, including through editing and deleting. For example, the spelling of a recognized name can be corrected.

The information log can be stored to permit subsequent retrieval and processing. For example, a link to the information log corresponding to a communication session can be included in a call history list or a file structure, such as a folder or directory. In some implementations, an audio recording of the communication session can be accessed in conjunction with the information log, such as for verification of one or more recognized information items, In addition, a time stamp associated with an information item can be used to access the corresponding portion of the audio recording, permitting the information item to be compared with the corresponding recorded audio.

In some implementations, the recognizer unit 250 automatically stores the identified terms at the storage unit 240. In some implementations, the recognizer unit 250 stores the recognized words and phrases when a user responds to the audible, visual or textual output 220. In some implementations, the user responds to the output 220 with a response, such as by issuing a voice command or by pressing a hardware button, a virtual button, or a soft button to store the recognized words. Alternatively, the user can respond with a gesture, such as by holding the communication device 120 and making a pointing gesture, or with motion, such as by shaking the communication device 120.

The recognizer unit 250 can be implemented to receive audio data as the audio data is input 210 into the communication module 200. The recognizer unit 250 also can receive audio data captured by the recording unit 230. Additionally, the recognizer unit 250 can receive audio data stored at the storage unit 240. In some implementations, the recognizer unit 250 uses a Hidden-Markov speech recognition model.

The data communication link 260 can be implemented as a system bus or a signal line. Audio data and information associated with the audio data can be transmitted on the data communication link 260. The voice command controller 300 can be implemented to receive one or more commands. The one or more commands can be received from a user operating the communication device in which the voice command controller 300 is located.

Figure 3:
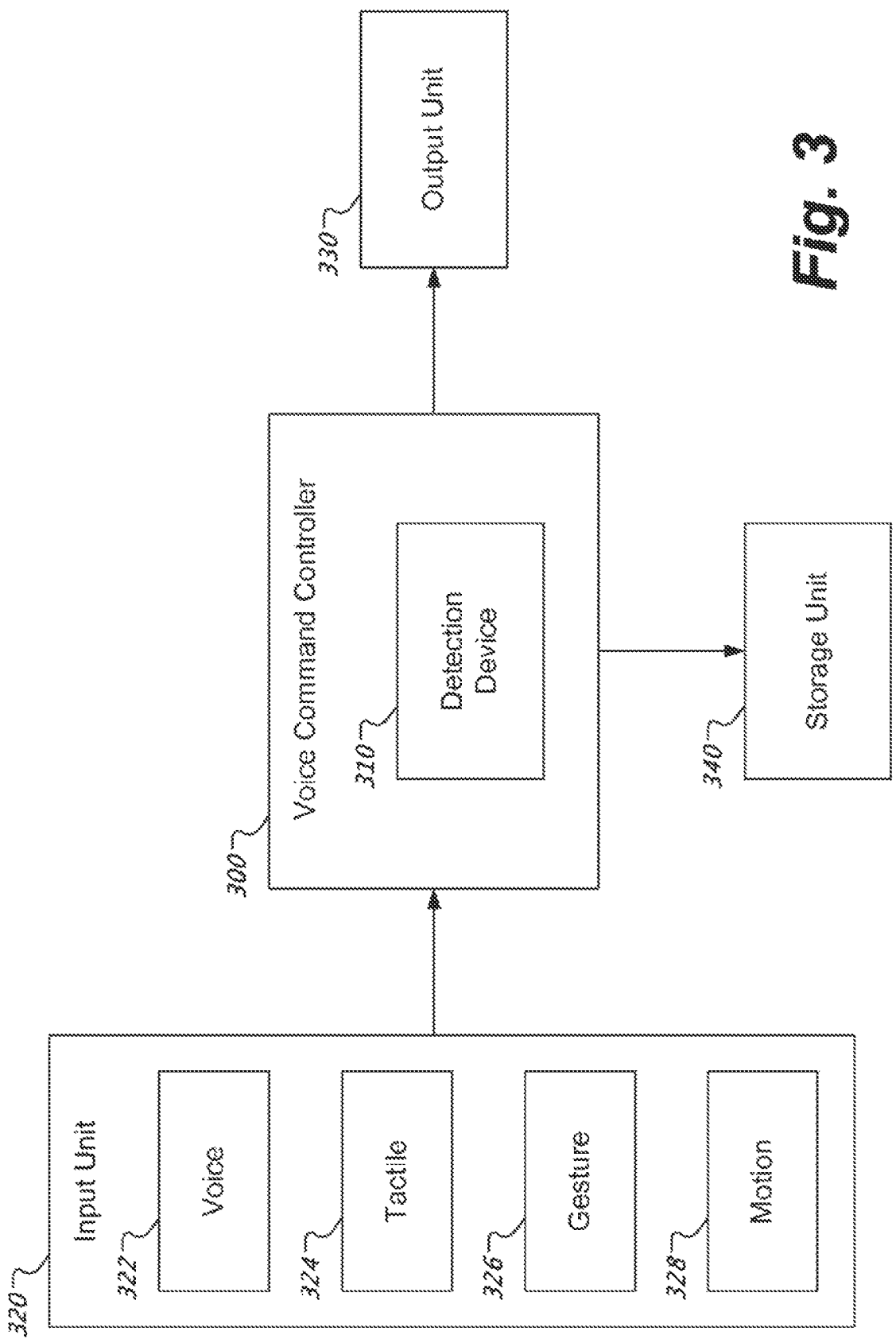
FIG. 3 is a block diagram that includes an example voice command controller.

FIG. 3 is a block diagram that includes an example voice command controller 300. The voice command controller 300 can be implemented to receive input and produce output, and to parse one or more commands from audio data received during a communication session.

In some implementations, the voice command controller 300 differentiates between voice information associated with a phone conversation and one or more voice commands spoken into a microphone operatively coupled to a communication device in which the voice command controller 300 is installed. The voice command controller can be implemented to recognize voice commands spoken by a caller on the near end, e.g., the originating source, from the real-time voice information transmitted during a communication session.

The voice command controller 300 also can be implemented to ignore voice commands spoken by a caller on the far end, e.g., the secondary source, of the phone conversation. The voice command controller 300 includes a detection device 310. The detection device 310 can be implemented to parse one or more voice commands included in audio data received from the local source (i.e., the device user) during the communication session. The one or more voice commands can be received during a connected and active communication session. The voice command controller 300 can receive the one or more voice commands without causing the communication device to switch from a conversational mode to a command mode. In some implementations, the detection device 310 filters out ambient noise during the communication session.

The detection device 310 can be programmed to recognize pre-defined key words and phrases associated with the one or more voice commands. The pre-defined key words and phrases can include words and/or phrases defined by either or both of the manufacturer and one or more device users. For example, the pre-defined key word "phone" can be programmed such that when the detection device 310 detects the key word "phone," the detection device 310 recognizes that the key word is associated with a command and informs the voice command controller 300 that one or more actions corresponding to the command should be taken. Actions performed by the voice command controller 300 can include generating audible, visual or textual data corresponding to the received audio data. For example, the voice command controller 300 can output textual data corresponding to the ten digits associated with the audio data triggering the key word "phone" audio data, in a similar manner as described above with respect to the recognizer unit 250.

The detection device 310 can include a detection filter that recognizes the differences between a voice at the near end of the phone conversation, the local source, and a voice at a far end, a remote source. For example, the detection filter can include speech recognition software based on the Hidden-Markov model that can distinguish between one or more voices during a communication session. In some implementations, audio signals are detected without the detection filter. For example, audio signals received from the near end can be received through a microphone operatively coupled to the communication device and can be routed to the communication module 200.

In some implementations, a dictation recognition system (e.g., a parser) included in the detection device 310 interprets text from a phone conversation. The dictation recognition system can include a text post-processor, or data detector that is configured to parse through the generated text to obtain useful textual information, e.g., target information. Examples of useful textual information include phone numbers, email addresses, dates and home addresses. In some implementations, the useful textual information is highlighted, or otherwise enhanced, such that a user can perform one or more actions on the textual information. For example, a user can click on a phone number that was recognized and highlighted by a data detector, to call the party associated with the phone number.

In some implementations, the detection device 310 can detect and extract useful information from a live or automated conversation and can store the information in an information log. For example, information such as a physical address, an email address, a phone number, a date, and a uniform resource locator can be detected and inserted into the information log. The information log can be implemented as a list or queue of information items recognized during a communication session. For example, the information log can be configured to include information items associated with a list of pre-defined or programmed words and phrases that are detected and identified by the detection device 310 in the course of a communication session. When an item of information is detected, e.g. a phone number, the item of information can be inserted into the information log. Additional information also can be associated with the item of information, such as a time stamp and/or an indication of the item's source. The information log can be displayed, e.g., in a user interface display of a device, such as an interactive device.

The device also can be configured to output a signal, such as a tone or haptic feedback, when a new information item is added to the information log. Each information item can also be associated with an identifier that identifies a particular user or communication device from which the information item was derived. Once added to the information log, an item of information can be acted on, such as through a voice command or tactile input. For example, a phone number recognized during a communication session and added to the information log can be dialed during the communication session, such as to initiate a three-way call. Also, an e-mail address can be accessed to generate a message or message template during the communication session.

The information log also can be accessed after the corresponding communication session ends. For example, a recognized telephone number can be used to initiate a new communication session or an item of contact information can be used to generate a new contact or update an existing contact. One or more items of information included in the information log also can be altered, including through editing and deleting. For example, the spelling of a recognized name can be corrected. A user can also associate particular commands with one or more items of target information.

Further, the information log can be stored to permit subsequent retrieval and processing. For example, a link to the information log corresponding to a communication session can be included in a call history list or a file structure, such as a folder or directory.

In some implementations, an audio recording of the communication session is accessed in conjunction with the information log, such as for verification of one or more recognized information items. In addition, a time stamp associated with an information item can be used to access the corresponding portion of the audio recording, permitting the information item to be compared with the corresponding recorded audio.

The detection device 310 can be implemented to process the one or more voice commands concurrent with the phone conversation. The one or more voice commands also can be recorded and time stamped by the detection device 310 for later execution. The recorded time stamped voice commands can be stored and displayed in a command list in, e.g., a user interface display. The detection device 310 also can record and time stamp the detected key words associated with the one or more voice commands. The recorded time stamped key words further can be stored and displayed in an information log. In some implementations, the information log and the command list can be integrated.

The voice command controller 300 can receive input from an input unit 320. The input unit 320 can be implemented to provide one or more types of input to the voice command controller 300. The input received from the input unit 320 can include one or more of: voice input 322; tactile input 324; gesture input 326; and motion input 328. The voice input 322 can include one or more voice commands directing the voice command controller 300 to perform one or more actions corresponding to the one or more voice commands.

For example, the voice input 322 can include a command to the voice command controller 300 to prepare an electronic message for dissemination to a particular person. Upon receipt of the command, the voice command controller 300 can be implemented to generate a shell electronic message to a particular contact named as a part of the command. For example, in response to a command to prepare an email for "Greg," the voice command controller 300 can generate an email addressed to Greg.

The voice input 322 also can include a command to initiate dictation, e.g., to generate an information log that is not associated with a particular communication session. For example, the voice command controller 300 can be implemented to transcribe and record Greg's email address as Greg's email address is dictated into the phone. The voice command controller 300 also can be implemented to read and recite stored information. For example, during a phone call with "Bob," the near end user can provide voice input 322 commanding the voice command controller 300 to "recite Greg's phone number"; in response to receiving the voice input 322, the voice command controller 300 can produce output 330 reciting Greg's phone number that is audible to Bob, the near end user, or both.

The tactile input 324, gesture input 326 and motion input 328 can be implemented as physical inputs. The physical inputs can be used in conjunction with the voice input 322 to differentiate the one or more voice commands, e.g., commands, from the real-time voice information, including target information. The physical inputs can be received before, concurrently with, or after the voice input 322, i.e., one or more voice commands, is received. For example, as a user speaks one or more voice commands into the communication device, the user also can press a button located on the communication device to indicate that the spoken words are distinct from regular voice information associated with the phone conversations and should be treated as a command.

Tactile input 324, such as pressing a hardware, virtual or soft button, also can be used to determine whether one or more voice commands should be treated as a string of commands, or distinguished as separate individual commands. Gesture input 326, such as gesturing with one or more fingers while holding the communication device in the gesturing hand, also can be used to indicate that spoken words should be treated as a command, in addition to determining the difference between a string of commands and separate individual commands.

Additionally, motion input 328, such as moving or shaking the communication device, also can be used to indicate that spoken words should be treated as a command, as well as determining the difference between a string of commands and separate individual commands. In some implementations, the voice input 322, as well as the physical inputs, can cause one or more processors at the voice command controller 300 to generate a new file corresponding to the received input. In some implementations, the physical inputs can be the sole input instructing the voice command controller 300 to perform the one or more actions corresponding to the received input.

The voice command controller 300 can produce output at an output unit 330. The output unit 330 can be implemented to provide one or more types of output from the voice command controller 300. The output unit 330 can include producing textual data corresponding to the received audio data. The textual data can be displayed on a display screen of, e.g., the communication device 120 depicted in FIG. 1. For example, in response to receiving voice input 322 directing the voice command controller 300 to perform an action, the voice command controller 300 can instruct the output unit 330 to produce textual data corresponding to the received voice information on the touch screen of, e.g., a smart phone. The output unit 330 also can produce audible and visual data based on the one or more actions performed by the voice command controller 300 in response to the one or more voice commands. In some implementations, the output unit 330 can be used to provide the output 220 depicted in FIG. 2.

Output from the voice command controller 300 can be stored in a storage unit 340. In some implementations, the storage unit 340 can be integrated physically and/or logically with the storage unit 240. In other implementations, the storage unit 340 can be both physically and logically separate from the storage unit 240. The storage unit 340 can be implemented to store information associated with the one or more actions taken by the voice command controller 300. For example, in response to receiving voice input 322 from a user directing the voice command controller 300 to "remember the phone number" recited by the caller on the far end, the voice command controller 300 can produce textual data corresponding to the phone number at the output unit 330 and also can store the phone number at the storage unit 340. The storage unit 340 can be implemented as the storage unit 240 in the communication module 200 depicted in FIG. 2. The storage unit 340 can be configured as a local storage device or local memory cache. In some implementations, the storage unit 340 can be located remotely from the communication device 120 depicted in FIG. 1. For example, the storage unit 340 can be located on a server maintained by a network provider. In some implementations, upon detecting particular pre-defined words and phrases, such as numbers, the communication module 200 can transmit a portion, or the entirety, of the particular audio data to a remote server. The dedicated server can be configured to recognize particular programmed utterances with greater clarity, and also can store the audio data. In some implementations, the server can transmit the clarified detected utterance to the communication device.

Figure 4:
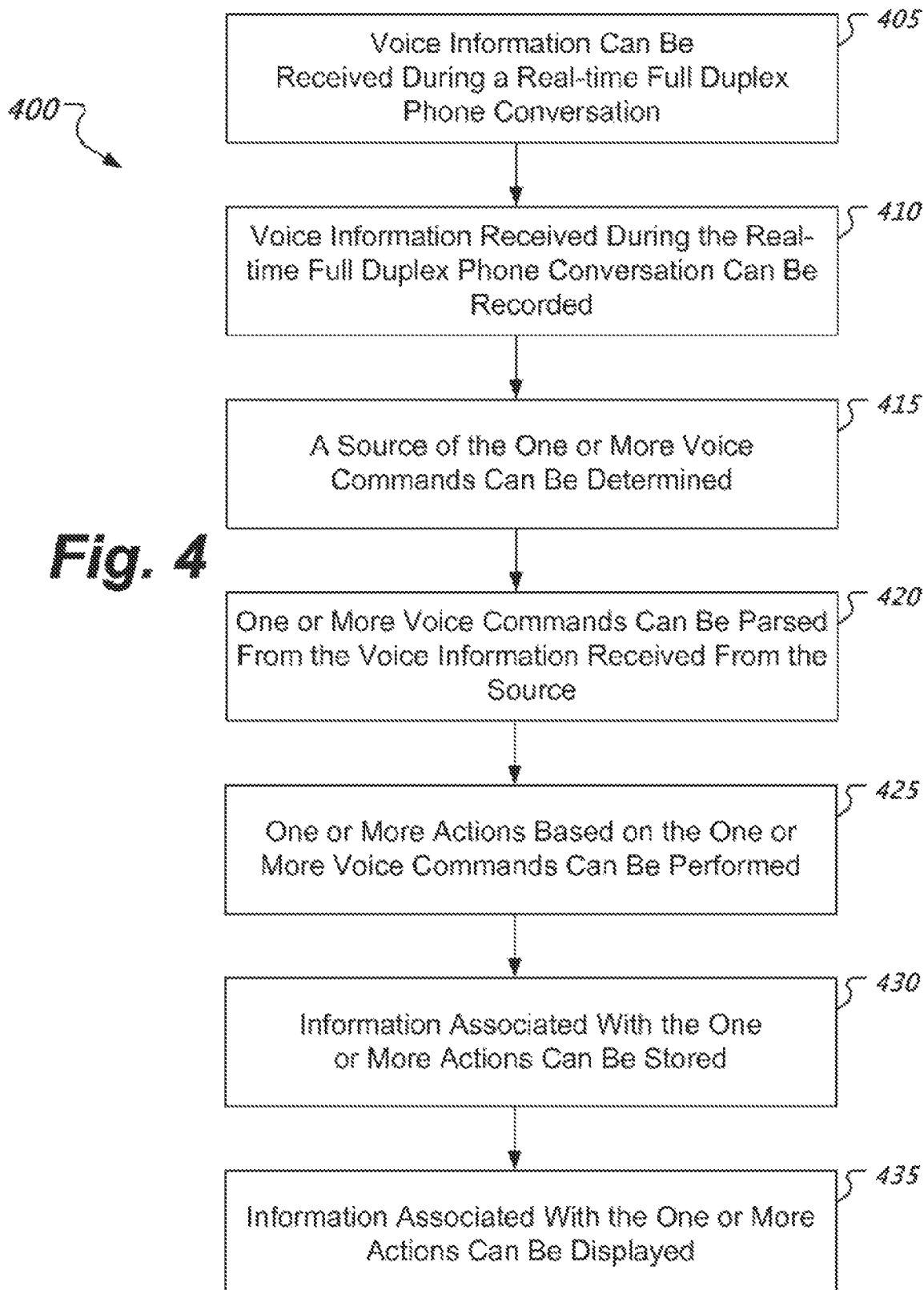
FIG. 4 is a flow chart showing an example process for performing actions in response to voice commands.

FIG. 4 is a flow chart showing an example process for performing actions in response to voice commands. The process 400 can, for example, be implemented in the communication devices 110, 120 depicted in FIG. 1, the communication module 200 depicted in FIG. 2 and the voice command controller 300 depicted in FIGS. 2-3.

Voice information, including one or more voice commands, can be received during a real-time full duplex phone conversation or from a voicemail left for the user by a caller (as described above in relation to FIG. 1) (405). The voice information can be received by a communication device. The communication device can be a mobile phone or other verbal communication device. The real-time full duplex phone conversation can be a bidirectional communication session. A user operating the mobile phone can speak the one or more voice commands into the mobile phone during the communication session and the mobile phone can identify or parse the commands from the conversation. The one or more voice commands can direct the communication device to take one or more actions corresponding to the one or more voice commands.

In some implementations, the one or more voice commands can be received after the communication session has ended. For example, at the conclusion of a communication session, a user can instruct the communication device to take an action based on information received during the communication session. In some implementations, the one or more voice commands can be accompanied by tactile, gesture or motion input. The tactile, gesture and motion input can be associated with the one or more voice commands and can be used to differentiate the one or more voice commands from other portions of the phone conversation. The accompanying input also can be received by the communication device during an active communication session or after the communication session has ended.

Voice information received during the real-time full duplex phone conversation (or voicemail) can be recorded (410). The voice information can be received by the communication device. The voice information can be encoded in digital audio data. The recording can occur automatically, or in response to input initiating the recording. In some implementations, the voice information can be continuously monitored during a real-time communication session, including a bidirectional communication session. The voice information also can be recorded continuously for the duration of the real-time full duplex phone conversation.

A source of the one or more voice commands (or keywords) can be determined (415). A speech recognition algorithm, such as the Hidden-Markov model, implemented in a detection device can filter voice information in audio data to determine the source of the one or more voice commands. In some implementations, the source can be the caller operating the communication device, e.g., the originating source.

The one or more voice commands (or keywords) can be parsed from the audio data received from the source (420). Two or more users operating communication devices can participate in the communication session. For example, the communication session can include a telephone conversation between two or more users operating smart phones. Audio data can include any and all voice information exchanged during the telephone conversation. The one or more voice commands can be detected by a detection module in the communication device.

In some implementations, the detection module can be located external from the communication device. The detection module can be implemented to identify the one or more voice commands in the voice information received from the source during the real-time full duplex phone conversation. For example, the detection module can identify key words and phrases associated with the one or more voice commands, such as "phone, remember that street address," from the remainder of the telephone conversation. The detection module can extract the information associated with the one or more voice commands and can manage the extracted information differently than the received audio data.

One or more actions based on the one or more voice commands (or keywords) can be performed (425). The one or more voice commands can cause a processing module (see, e.g., FIG. 5) at the communication device to perform one or more actions corresponding to the one or more voice commands. The one or more actions can include generating textual data corresponding to the voice information received during the real-time full duplex phone conversation. For example, the processing module can produce textual data corresponding to the street address recited by the caller on the other end of a telephone conversation. The one or more actions also can include generating audible or visual data corresponding to the audio data received during the communication session. For example, in response to a voice command directing the communication device to "repeat the street address," the processing module can produce audible data corresponding to the street address recited during the communication session. In some implementations, audio data received during the communication session also can be provided to one or more applications. For example, audio data received during a communication session can be used to populate one or more fields of an electronic mail message or inserted into a contact record. Further, audible data also can be provided to another device, such as another device participating in the communication session.

Information associated with the one or more actions can be stored (430). The information associated with the one or more actions can be stored in a storage unit located within or outside the communication device. For example, the storage unit can be implemented as a local storage device or local memory cache within the communication device. In some implementations, the information can be stored in a particular location of the storage unit based on the one or more commands. For example, in response to a voice command directing the communication device to "store the street address in my contacts folder," the processing module can store the audio data corresponding to the street address in the contacts folder portion of the storage unit. In some implementations, physical commands can be used to direct the communication device to perform one or more actions. For example, a user can interact with, e.g., touch or press, a command button in an communication device user interface to store the street address in the contacts folder.

Information associated with the one or more actions can be displayed (435). For example, the generated textual data corresponding to the voice information recorded during the real-time full duplex phone conversation can be displayed in, e.g., a user interface of a data processing apparatus (e.g., a smart phone, an interactive device, or other electronic devices with display components). The information associated with the one or more actions also can include the corresponding voice commands and key words. In some implementations, the information can be presented in an information log.

Figure 5:
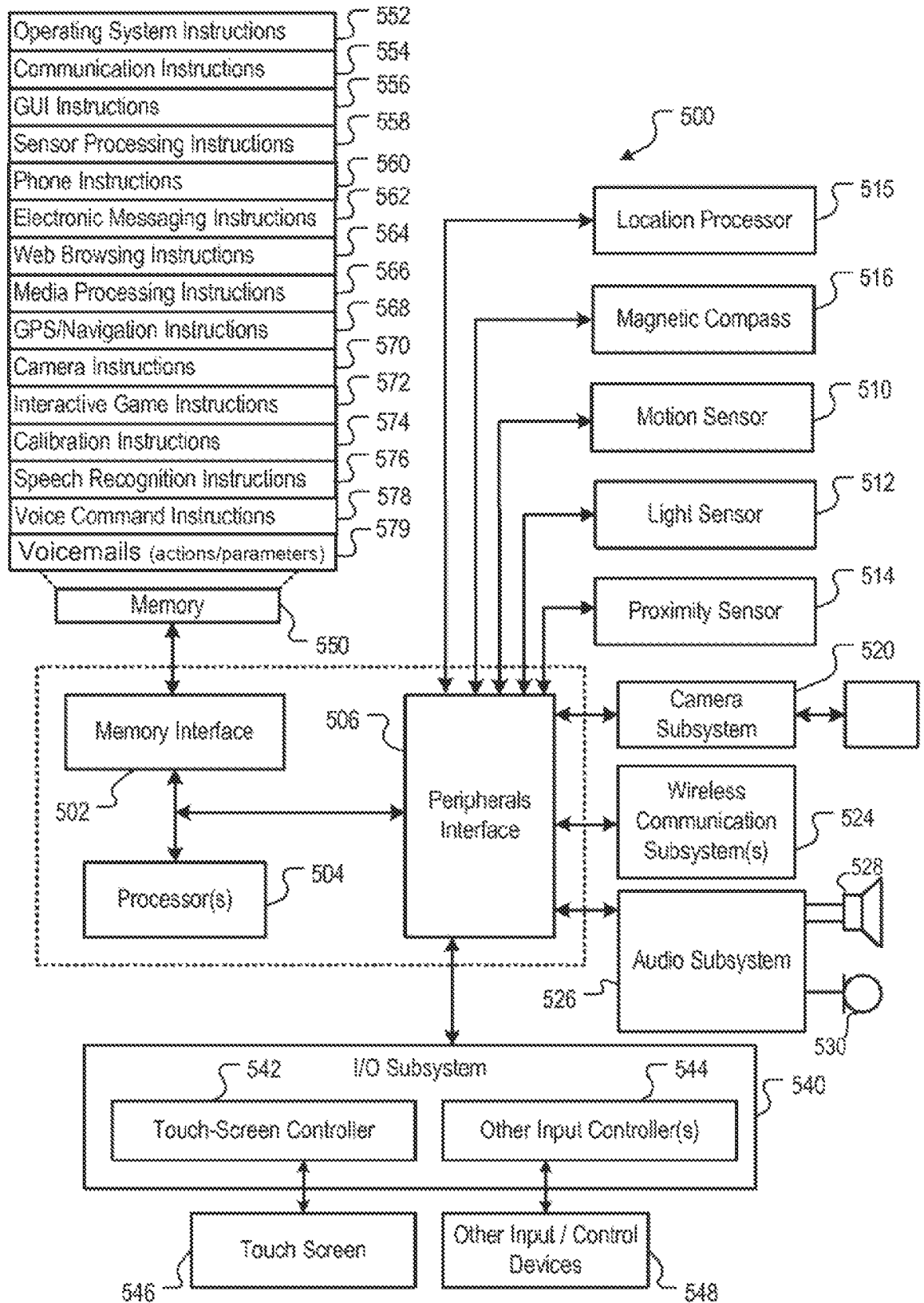
FIG. 5 is a block diagram illustrating an example architecture of an interactive device that can be utilized to implement the systems and methods described herein.

FIG. 5 is a block diagram illustrating an example architecture of an interactive device 500 that can be utilized to implement the systems and methods described herein. The interactive device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. Various components in the interactive device 500 can be coupled together by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. A location processor 515 (e.g., GPS receiver) can be connected to the peripherals interface 506 to provide geopositioning. A magnetic compass integrated circuit 516 can also be connected to the peripherals interface 506 to provide orientation (e.g., to determine the direction of due North).

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the interactive device 500 is intended to operate. For example, an interactive device 500 can include communication subsystems 524 designed to operate over a wireless network, such as a GSM network, a GPRS network, an EDGE network, a Wi-Fi or WiMax network, and a Bluetooth™ network, or a wired network. In particular, the wireless communication subsystems 524 may include hosting protocols such that the device 500 may be configured as a base station for other wireless devices.

An audio subsystem 526 can be coupled to a speaker 528 and a microphone 530 to facilitate voice-enabled functions, such as voice recognition, voice replication, digital recording, and telephony functions. The I/O subsystem 540 can include a touch screen controller 542 and/or other input controller(s) 544. The touch-screen controller 542 can be coupled to a touch screen 546. The touch screen 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration may disengage a lock of the touch screen 546; and a pressing of the button for a second duration that is longer than the first duration may turn power to the interactive device 500 on or off. The user may be able to customize a functionality of one or more of the buttons. The touch screen 546 can, for example, also be used to implement virtual or soft buttons and/or a keyboard.

In some implementations, the interactive device 500 can present recorded audio and/or video files, such as MP3, AAC, and MPEG files. In some implementations, the interactive device 500 can include the functionality of an MP3 player.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks. The operating system 552 may include instructions for handling basic system services and for performing hardware dependent tasks. In some implementations, the operating system 552 can be a kernel (e.g., UNIX kernel). The memory 550 may also store communication instructions 554 to facilitate communicating with one or more additional devices, one or more computers and/or one or more servers.

The memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic messaging related processes and functions; web browsing instructions 564 to facilitate web browsing-related processes and functions; media processing instructions 566 to facilitate media processing-related processes and functions; GPS Navigation instructions 568 to facilitate GPS and navigation-related processes and instructions; camera instructions 570 to facilitate camera-related processes and functions; interactive game instructions 572 to facilitate interactive gaming; calibration instructions 574 to facilitate calibrating interactive devices; speech recognition instructions 576 to facilitate recognizing speech; voice command instructions 578 to facilitate detecting and distinguishing voice commands or keywords, as described in reference to FIGS. 1-4 and FIG. 7-9, and voicemail messages 579. In some implementations, the GUI instructions 556 and the media processing instructions 566 implement the features and operations described in reference to FIGS. 1-4.

In some implementations, the voicemail messages 579 are stored locally in memory 550, while in other implementations, voicemail pointers are stored in memory 550, where the pointers point to voicemail messages stored on a remote sever. In some implementations, the voicemail messages 579 are audio recordings of voicemail messages left for the user of the device by one or more callers. In other implementations, the voicemail messages 579 are text files of audio messages that have been converted from speech to text by the speech recognition instructions 576. In some implementations, the voice commands or keywords detected by the voice command instructions 578 are an action and one or more associated action parameters as described in further detail in relation to FIGS. 7-9 below.

The memory 550 may also store other software instructions (not shown), such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 550.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the interactive device 500 may be implemented in hardware and/or in software, including in one or more signal processing and/or application specific integrated circuits.

FIG. 6A is a screenshot that includes an example user interface 600. In particular, the user interface 600 displays a transcript 610 of a conversation, e.g., the example conversation described above with respect to FIG. 2, that is currently occurring between the user of communication device 620 and another user "Dad", as indicated by the label "Dad" and a user interface element "End Call" configured to end the communication session. Note that particular words, e.g., key words, in the transcript 610 are enhanced, as illustrated in FIG. 6A by bold formatting. A suggestion 630, in the form of visual feedback, is generated based on the key words and displayed in the user interface 600. In the example, if the user selects "Yes", the key words can be sent to a restaurant reservation service to obtain available reservations.

FIG. 6B is a screenshot that includes another example user interface 650. The user interface 650 displays an example information log 660. Note that, in some implementations, the information log can be rendered in a similar manner as other logs, e.g., logs for dialed calls, received calls, missed calls, are displayed in the communication device 620. In the example, identified commands and suggested commands, e.g., "Reservation" and "Call" are displayed in a first column of the information log 660. Identified target information, e.g., "Tonight", "Eight", "Sushi", "Brother" is displayed in a second column that is adjacent to the first column.

In some implementations, each call in a call log, e.g., the logs for dialed calls, received calls, and missed calls, that has an associated information log can have a selectable interface element (e.g., a virtual button such as a chevron (») rendered next to a call). A user selection of the selectable interface element causes a respective call log to be displayed in the communication device 620. As an example, the call log can be displayed in a pop-up window that is superimposed over the call log.

Associations between target information and particular commands can be indicated by aligning a particular command with associated target information. In FIG. 6B, the command "Reservation" to request a reservation can be performed on one or more of the target information items "Tonight", "Eight", and "Sushi." Similarly, the command "Call" can be performed on the target information item "Brother." The user interface 650 also includes a virtual keyboard, e.g., a virtual representation of a keyboard that facilitates editing of the information log 660 as described above.

As described above, these same systems and methods can be applied to recorded information, like voicemail messages. The systems and methods may be implemented on the device itself, on a remote server, or on a combination of the device and a remote server. Further details of such a system are also described in U.S. Provisional Application Ser. No. 61/646,831, filed May 14, 2012, which is incorporated by reference herein.

Figure 7:
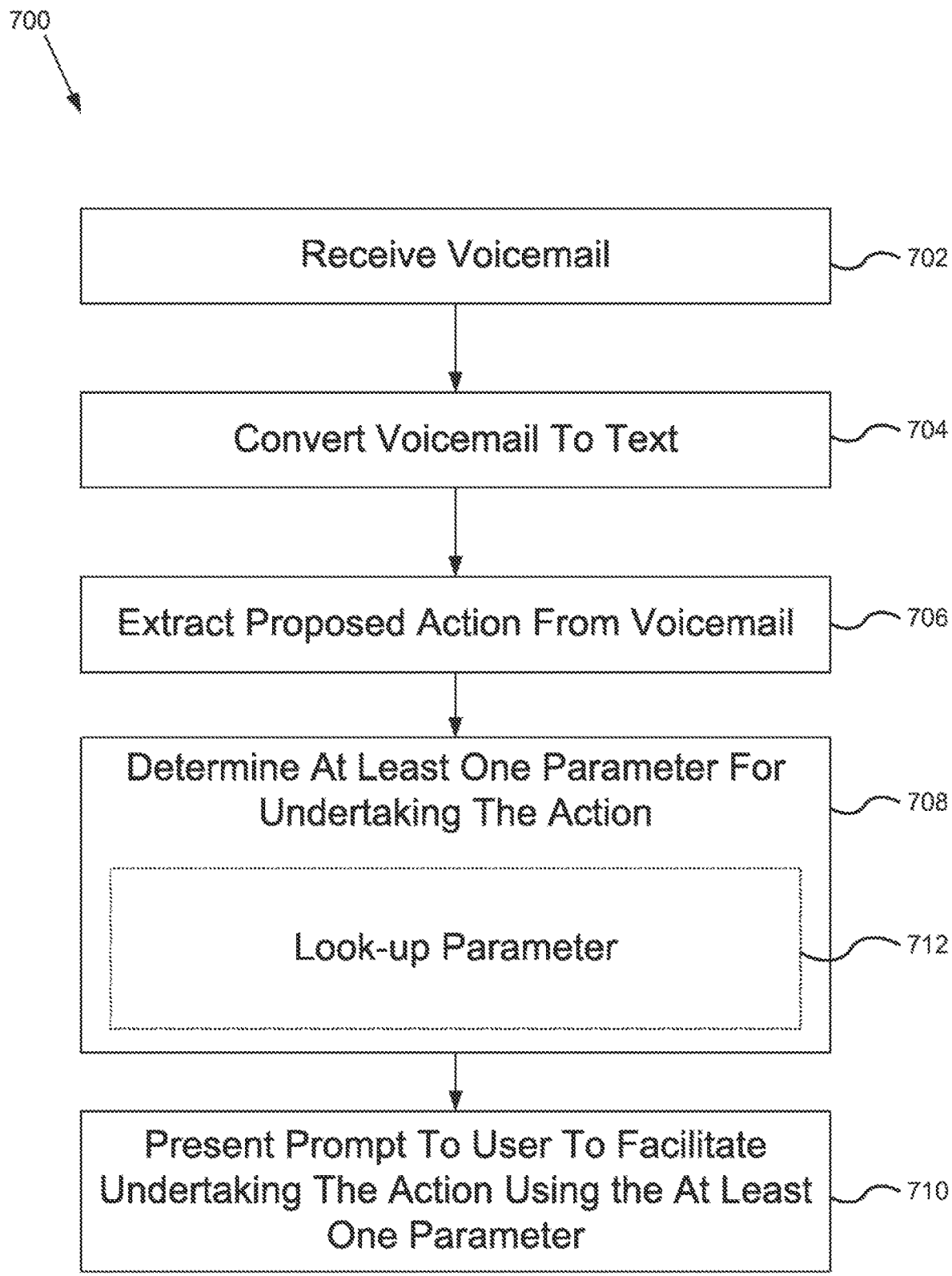
FIG. 7 is a flow chart of an exemplary method for operating a digital assistant to automatically act on incoming voicemail messages received on a user's interactive device.

FIG. 7 is a flow chart of an exemplary method 700 for operating a digital assistant to automatically act on incoming voicemail messages received on a user's interactive device. In some implementations the interactive device is a user's mobile device, like a smartphone, such as that described in relation to FIG. 5. Initially, recorded voice messages (e.g., voicemail messages) are provided (702) from one or more callers to a user of the device. For example, the device receives one or more voicemail messages 579 of FIG. 5. In some implementations, these voicemail messages are audio files of recorded voice messages, while in other implementations they are pointers to audio recordings stored on a remote server.

In some implementations, the recorded voice messages are then converted (704) from speech to text. In some implementations, this conversion occurs automatically without user intervention as soon as the voicemail message is received at the device, while in other implementations, this occurs at any other suitable time, e.g., when the device has processing cycles to spare.

hereafter, a number of steps occur automatically without user intervention. First, a proposed action to be performed by the user is extracted (706) from the voice message. In some implementations, the voice command instructions 578 of FIG. 5 extract the proposed action from the converted text of the voicemail message as described above. For example, the voicemail message may state the following: "John, please can you email me a copy of yesterday's presentation." The voice command instructions 578 of FIG. 5 determine the proposed action is to send the caller an email message. In other words, the action proposed by the caller is to email the caller with certain information.

Second, at least one action parameter for undertaking the action is determined (708). The action parameters are any parameters that are necessary or optional for performing or undertaking the action. For example, in the above example, the action parameters are the caller's email address and "yesterday's presentation." Both of these parameters may be required for performing or undertaking the action of sending via email a copy of yesterday's presentation to the caller. In some implementations, the one or more action parameters are also extracted from the voice message.

Figure 8:
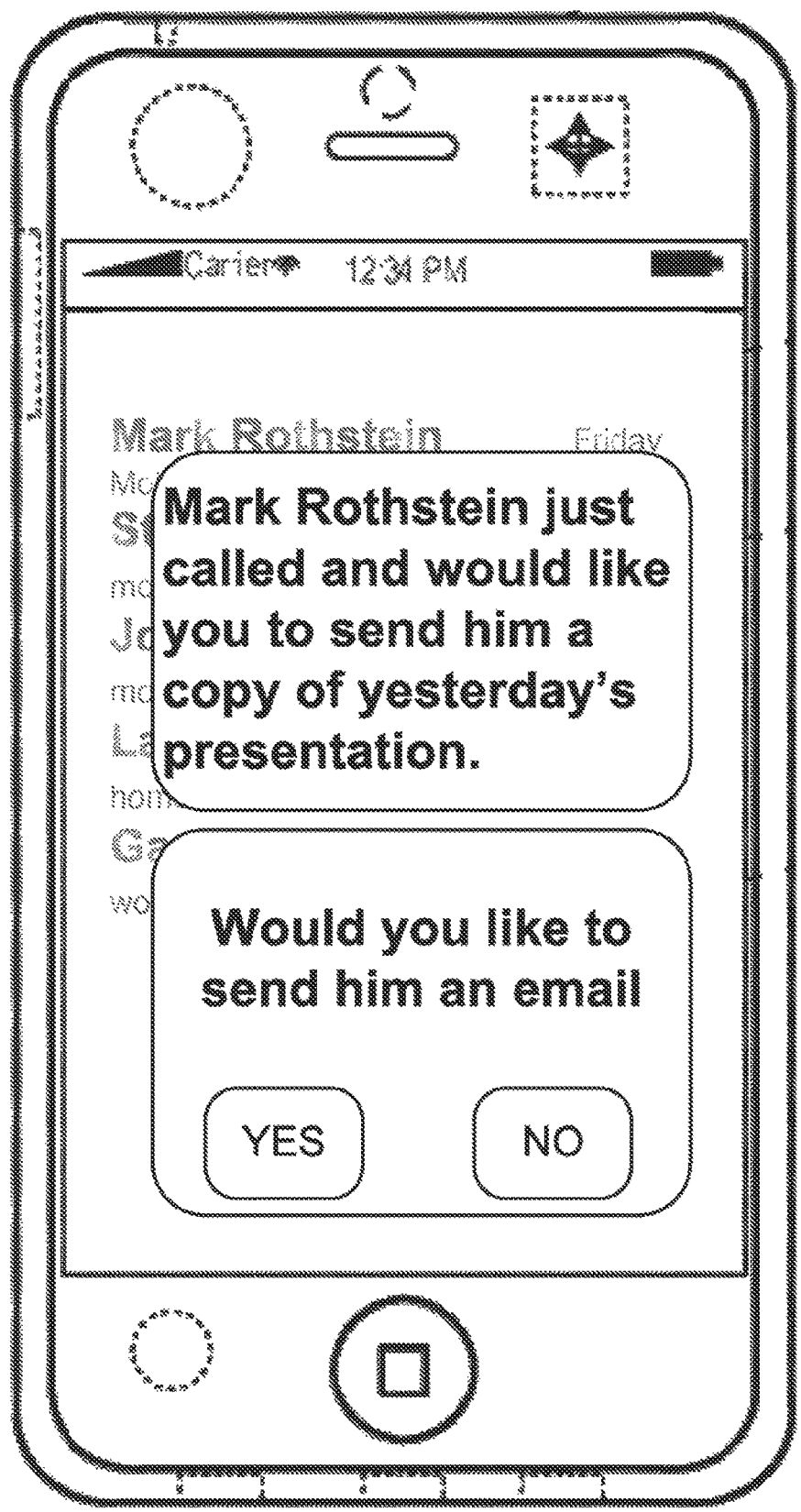
FIGS. 8 and 9 show exemplary screenshots of presented to a user.
Figure 9:
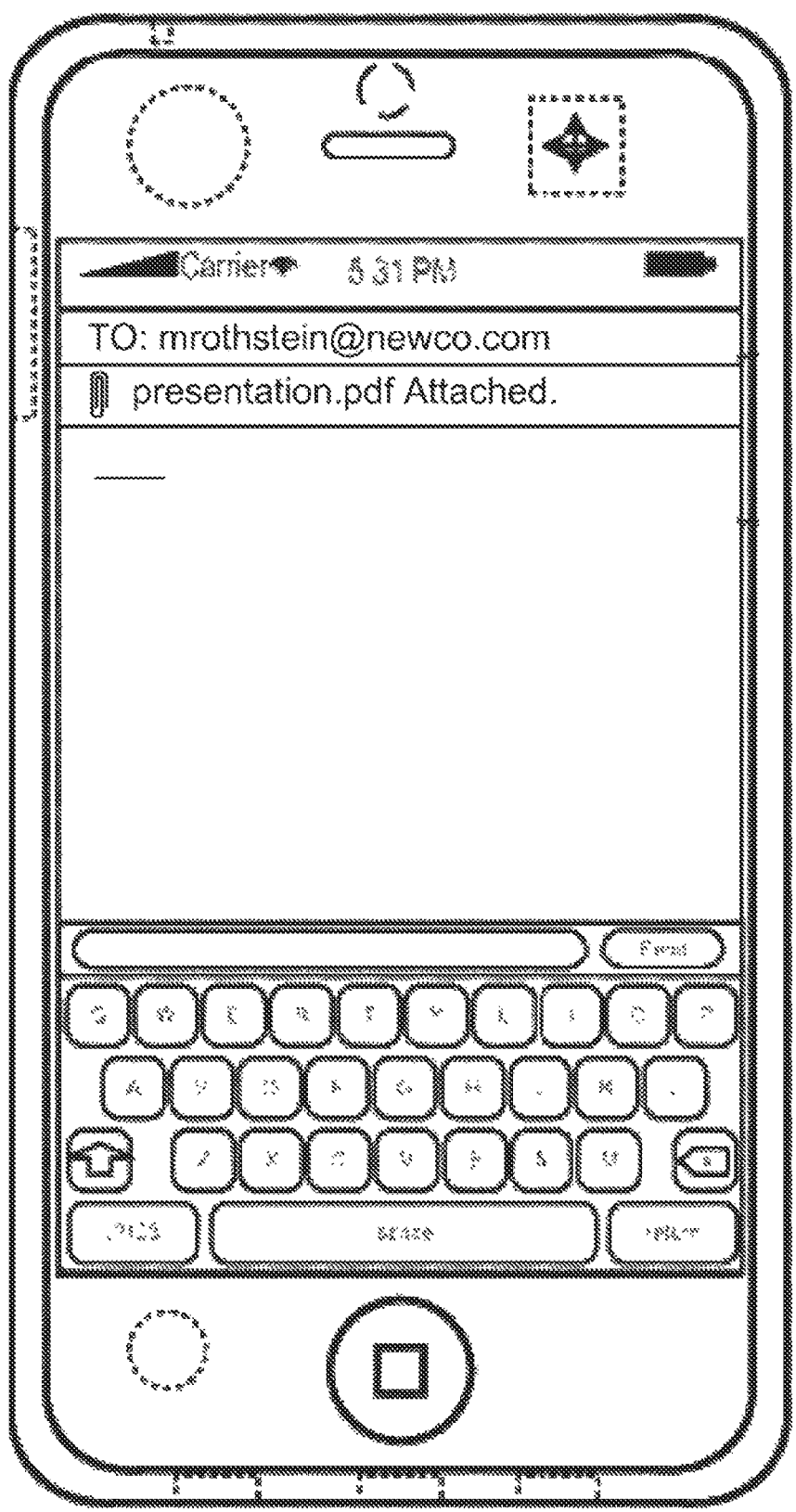

Finally, the user of the device is presented (710) with a prompt facilitate undertaking the action using the at least one the parameter. Completing the example above, the voice command instructions 578 of FIG. 5 presents the user with an option to send the caller an email An example of such a prompt is shown in FIG. 8. If the user selects to send the caller an email, a draft email is generated as shown in FIG. 9.

Some examples of actions and action parameters include:
1. Action: calling the caller back;
   Action parameter: the caller's name, telephone number, time to call back, date to call back, etc.
2. Action: calling another person (not the caller);
   Action parameter: the person's name, telephone number, time to call back, date to call back, etc.
3. Action: sending an email message to the caller (or another person); Action parameter: caller's/person's name or email address; content of the email message, a desired attachment, a time to email, a date to email, etc.
4. Action: sending a message (e.g., SMS) to the caller (or another person); Action parameter: caller's/person's name, email address or phone number; content of the message, a desired attachment, a time or date to send the message, etc.
5. Action: visit a webpage;
   Action parameter: the webpage's uniform resource locator (URL) name of the webpage or website, etc.
6. Action: watch a online video;
   Action parameter: an identifier or name of the video; a URL of the video; etc.
7 Action: a recommendation to download or purchase a software application; Action parameter: the name or location of the application, etc.
8. Action: to remember to do something (i.e., a reminder); Action parameter: the name of the task to be performed; the time period (e.g., time of day and date) that the task should be performed.
9. Action: to perform a task;
   Action parameter: the task to be performed;
10. Action: to enter a calendar entry;
    Action parameter: task name, date/time, etc.
11. Action: to meet;
    Action parameter: meeting name, location, time/date, etc.
12. Action: to lookup or go to (navigate to) to a specific geographic location; Action parameter: location, etc.
13. Action: adding contact details to the user's contact book;
    Action parameter: contact details.
14. Action: checking on the user's availability;
    Action parameter: time period (date and time).

In those implementations where the action is to call or send a text message to the caller or another person (e.g., "Dave, mom asked that you call her tonight"), a telephone number is required. If the telephone number is provided in the voicemail message, then that number may be used to call the caller/person. If a number is not provided (see example above), then the number (action parameter) is first obtained from the user's contact or address book. For example, if the voicemail is to call "mom" and no number is provided, then a search is performed (712) of the user's contact book for an entry matching "mom, "mother", etc. The same method can be performed for any other contact details, such as an email address, physical address, alternative phone numbers, etc. Similarly, any other action parameter may be looked-up in the same way. For example, a URL, calendar entry, application identifier, online video, etc., may all be looked-up based on another action parameter extracted or inferred from the message (e.g., "look at today's WALL STREET JOURNAL" may initiate a search for a URL associated with "WALL STREET JOURNAL"). For example, if the voice mail says "Check out the XYZ website for Linda's new profile" without specifying the URL of the website, the URL of the XYZ website is looked-up and displayed to the user in a user interface element (e.g., a hyperlink) for accessing the website from the voicemail interface.

In some implementations, a source telephone number of the caller may be obtained from automatic caller identification, performing a reverse lookup etc. In other implementations, an existing contact is identified in a contact list or book associated with the user based on at least one of a source telephone number from which the recorded voice message originated and a name extracted from the recorded voice message.

In the implementations where the action is to send an email, the at least one action parameter is an email address of the caller, and the prompt presents the user with an option to send an email message to the email address. For example, the voicemail message may say "Dave, please can you email me at mark@newco.com to let me know if you are coming for dinner." The at least one parameter is the email address (markgnewco.com) of the caller. If the email address is not given by the caller, e.g., "Dave, please can you email me to let me know if you are coming for dinner," then the email address is obtained by first determining the name of the caller from caller identification (or any other means), and thereafter looking up the person's name in the user's contact book to locate an address. A prompt is then presented to the user with the option to email the caller. For example, in a voice mail retrieval user interface, the user is requested to confirm that he wants an email prepared to the caller's email address. Upon user confirmation by the user, a draft email is presented to the user, where the email includes the email address as a destination address (e.g., pre-populated into the "to" field).

In some implementations, a prompt presents the user with an option to store an email address extracted from the recorded voice message in the user's contact book (or update an existing contact entry). If the identity of the person leaving the voicemail message can be ascertained from the source phone number, or the voice mail message, the device optionally supplements existing contact information of the contact based on the email address left in the voice mail. In another implementation, the prompt provides the user with the option to store any other contact detail extracted from the voicemail message in the user's contact book. For example, where Mr. Smith calls from his office phone, and says "This is Kevin Smith, please call me at my cell 650-888-5889", the device finds an existing contact "K. Smith" in the user's contact list with an office phone number different from the number left in the voicemail message, the device offers to store the number "650-888-5889" as an additional contact number for the contact "K. Smith."

In some implementations, a transcript of the recorded voice message is also included in the body of the message, so that the user can easily see what they need to respond to, e.g., a question from the caller.

In implementations where a caller has left a voicemail about a previous email sent to the user, and where the user requests the user to write back, the user is presented with the option to prepare a reply email to the previously received incoming email mentioned in the recorded voice message. Upon user confirmation, a draft reply email to the incoming email mentioned in the recorded voice message is presented to the user.

In those implementations where the action is to send the caller certain information in a text message, e.g., and SMS message, the at least one parameter is a telephone number or email address of the caller. Here, the prompt presents the user with an option to send a text message to the telephone number or email address.

In some implementations where contact details are mentioned in the voicemail and other contact details exist for the same person in the user's contact book, the user may be presented with (i) only one or the other of the contact details, or (ii) the option to respond using one of multiple contact details. For example, if a caller leaves a callback number that is different from the source phone number, the device presents a user interface element to call either the callback number extracted from the voicemail message or the source phone number. In some implementations, the user interface element includes a "CALL" or "SEND" button or icon followed by the person's name or contact details. In another example where a caller has left a callback number that is different from the source phone number logged for the voicemail message, the device presents a user interface element to call the callback number extracted from the voicemail message, rather than the source phone number for the voice mail message. In some implementations, a determination is first made that the source phone number is a masked phone number (e.g., a company's main phone number), when choosing to not to display an option to call the source telephone number.

In some implementations, the prompt to the user is a speech prompt. In these implementations, the prompt is first generated as text. The prompt is then converted from text to speech, where after it is played to the user.

In the implementations where the action is to visit an online application store, the at least one parameter is a name of an application. Here, the prompt presents the user with an option to visit a page associated with the application at the online application store.

In the implementations where the action is to watch an online video, the at least one action parameter is a name of an online video. The prompt presents the user with an option to watch the online video. In some implementations, the device determines the correct video portal directly from the voice mail message. In some implementations, the device searches for the video mentioned in the message on one or more major or preferred online video portals beforehand, and presents the video from a suitable source that has been identified. In some implementations, the device merely takes the user to a default video portal, and enters the search for the user. The user can then browser through the search results that are returned. For example, after the user has viewed the video, the device presents an option for the user to callback the caller to discuss his/her opinions of the video. In some embodiments, the device determines the telephone number associated with the caller based on the contact list of the user, or the source phone number of the voice mail message.

In some implementations, instead of calling the caller, the device also allows the user to contact the caller via a text or email message.

In implementations where the action is to meet at a specified geographic location, the at least one action parameter comprises a name or an address of the geographic location. In some implementations, presenting the prompt further comprises presenting an option to the user to provide navigation to the specified geographic location. In some implementations, presenting the prompt further comprises presenting the user with an option to store the specified geographic location as a reminder or calendar entry. In some implementations, the at least one action parameter also includes a time period and the prompt presents the user with an option to store a reminder or calendar entry for meeting at the specified geographic location at the time period. For example, a reminder for "meet me at Pizza Hut in Cupertino in an hour" is created for the user.

In some implementations, the action is to perform a task at a later time, and the at least one action parameter is an action and a time for the task. Here, the prompt presents the user with an option to store a reminder to perform the task at the time. For example, if the voice mail message says, "This is mom, please call me tonight." The device prepares a reminder to call a number associated with "mom" at 8 pm that night. The time of 8 pm may be arbitrarily chosen for "tonight" or a time that the user normally makes calls to mom in the evening is used instead. In another example, if the caller left a message at 4:30 pm saying "meet me at Pizza Hut in Cupertino in an hour" and the user did not look at the device until 6:30 pm, the device offers an option to call the caller immediately, without setting a reminder.

It may also be determined whether the recorded voice message requires immediate attention from the user based on the action and the at least one action parameter. If it is determined that the recorded voice message requires immediate user attention, the prompt is immediately presented to the user. However, if it is determined that the recorded voice message does not require immediate user attention, the prompt is presented to the user at the time that the user accesses the recorded voice message. For example, if the caller left a message at 4:30 pm saying "meet me at Pizza Hut in Cupertino in an hour" and the device detects that the user has not checked his voice mail at 4:00 μm, the device proactively presents a prompt for the user to review the voice mail message, and optionally provides the user directions to the location of the meeting.

In implementations where a time is provided in a voicemail message, the system may first determine the address of the caller from the user's contact book, and then determine the appropriate time taking time zones into account. For example, the voicemail may state "this is John Goodman, call me at work at 1 pm." Here the system determines that John Goodman lives in California, while the user lives in Virginia; and offers to set a reminder to call John Goodman at 4 pm EST (1 pm PST) the following day.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a data processing apparatus, or programmable system including at least one programmable processor, which may be special or general purpose, coupled to receive data and instructions from, and to transmit data and instructions to, a storage system, at least one input device, and at least one output device.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, a keyboard, and a pointing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although implementations have been described in detail above, other modifications are possible. For example, the flow diagrams depicted in the figures do not require the particular order shown, or sequential order, to achieve desirable results. In addition, other steps may be provided, or steps may be eliminated, from the described flow diagrams, and other components may be added to, or removed from, the described systems. Accordingly, various modifications may be made to the disclosed implementations and still be within the scope of the following claims.

What is claimed is:

1. A method of operating a digital assistant, comprising: at a device having one or more processors and memory:
    while in a full duplex communication session between a caller and a user:
        automatically, without user input:
            extracting from the full duplex communication session a proposed action to be performed by the user, wherein extracting the proposed action comprises determining the proposed action from a plurality of proposed actions, wherein the proposed actions include at least one of: calling back the caller, calling a person other than the caller, storing contact details in a contact book of the user, sending an email to the caller, sending a text message to the caller, visiting a webpage, watching an online video, recommending to download or purchase a software application, reminding to perform a task, performing a task, entering a calendar entry, attending a meeting, and navigating to a geographic location;

determining at least one action parameter for undertaking the action; and presenting the user with a prompt to facilitate undertaking the action using the at least one parameter.

2. The method of claim 1, wherein the extracting further comprises:

converting the full duplex communication from speech to text; and extracting the action from the text.

3. The method of claim 2, wherein the extracting further comprises extracting the action parameter from the text.

4. The method of claim 1, wherein the action parameter is a source telephone number associated with the caller.

5. The method of claim 4, wherein the source telephone number is obtained from a contact book of the user.

6. The method of claim 4, wherein the source telephone number is obtained from caller identification.

7. The method of claim 1, wherein the action is for the user to call back the caller, and the at least one action parameter comprises a name or telephone number of the caller, and wherein the prompt asks the user if they would like to call back the caller.

8. The method of claim 1, wherein the action is for the user to call a person other than the caller, and the at least one action parameter comprises the name and telephone number of the person, and wherein the prompt asks the user if they would like to call back the person.

9. The method of claim 1, wherein the at least one parameter includes a specific time period, and the presenting of the prompt occurs at or before the specific time period.

10. The method of claim 1, wherein the action is to store contact details in a contact book of the user, and the at least one parameter comprises contact details.

11. The method of claim 1, wherein the action is to check on an availability of the user, and the at least one parameter is retrieved from a calendar of the user.

12. The method of claim 1, wherein the action is to send an email to the caller, and the at least one parameter is an email address of the caller, and wherein the prompt presents the user with an option to send an email message to the email address.

13. The method of claim 12, wherein presenting the prompt further comprises:

requesting user confirmation regarding whether to prepare an email to the email address; and upon user confirmation, presenting a draft email including the email address as a destination address and a transcript of the full duplex communication in a body of the draft email on the user device.

14. The method of claim 12, further comprising:

identifying an existing contact in a contact list associated with the user based on at least one of a source telephone number from which the full duplex communication originated and a name extracted from the full duplex communication, wherein the prompt offers to the user an option to store the email address extracted from the full duplex communication in association with the identified existing contact in the contact list.

15. The method of claim 12, wherein presenting the prompt further comprises:

requesting user confirmation regarding whether to prepare a reply email to an incoming email mentioned in the full duplex communication; and upon user confirmation, presenting a draft reply email to the incoming email mentioned in the full duplex communication.

16. The method of claim 1, wherein the action is to send the caller certain information in a text message, and the at least one parameter is a telephone number or email address of the caller, and wherein the prompt presents the user with an option to send a text message to the telephone number.

17. The method of claim 1, wherein presenting the prompt further comprises:

presenting a user interface element for initiating a telephone call to a telephone number extracted from the full duplex communication, in addition to a user interface element for initiating a telephone call to a source telephone number from which the full duplex communication session originated.

18. An electronic device comprising:

a processor; and memory coupled to the processor, the memory comprising instructions for:

while in a full duplex communication session between a caller and a user:

automatically, without user input:

extracting from the full duplex communication session a proposed action to be performed by the user, wherein extracting the proposed action comprises determining the proposed action from a plurality of proposed actions, wherein the proposed actions include at least one of: calling back the caller, calling a person other than the caller, storing contact details in a contact book of the user, sending an email to the caller, sending a text message to the caller, visiting a webpage, watching an online video, recommending to download or purchase a software application, reminding to perform a task, performing a task, entering a calendar entry, attending a meeting, and navigating to a geographic location;

determining at least one action parameter for undertaking the action; and presenting the user with a prompt to facilitate undertaking the action using the at least one parameter.

19. The electronic device of claim 18, wherein the extracting further comprises:

converting the full duplex communication from speech to text; and extracting the action from the text.

20. The electronic device of claim 19, wherein the extracting further comprises extracting the action parameter from the text.

21. The electronic device of claim 18, wherein the action parameter is a source telephone number associated with the caller.

22. The electronic device of claim 21, wherein the source telephone number is obtained from a contact book of the user.

23. The electronic device of claim 21, wherein the source telephone number is obtained from caller identification.

24. The electronic device of claim 18, wherein the action is for the user to call back the caller, and the at least one action parameter comprises a name or telephone number of the caller, and wherein the prompt asks the user if they would like to call back the caller.

25. The electronic device of claim 18, wherein the action is for the user to call a person other than the caller, and the at least one action parameter comprises the name and telephone number of the person, and wherein the prompt asks the user if they would like to call back the person.

26. The electronic device of claim 18, wherein the at least one parameter includes a specific time period, and the presenting of the prompt occurs at or before the specific time period.

27. The electronic device of claim 18, wherein the action is to store contact details in a contact book of the user, and the at least one parameter comprises contact details.

28. The electronic device of claim 18, wherein the action is to check on an availability of the user, and the at least one parameter is retrieved from a calendar of the user.

29. The electronic device of claim 18, wherein the action is to send an email to the caller, and the at least one parameter is an email address of the caller, and wherein the prompt presents the user with an option to send an email message to the email address.

30. The electronic device of claim 29, wherein presenting the prompt further comprises:
requesting user confirmation regarding whether to prepare an email to the email address; and
upon user confirmation, presenting a draft email including the email address as a destination address and a transcript of the full duplex communication in a body of the draft email on the user device.

31. The electronic device of claim 29, the memory further comprising instructions for:
identifying an existing contact in a contact list associated with the user based on at least one of a source telephone number from which the full duplex communication originated and a name extracted from the full duplex communication, wherein the prompt offers to the user an option to store the email address extracted from the full duplex communication in association with the identified existing contact in the contact list.

32. The electronic device of claim 29, wherein presenting the prompt further comprises:
requesting user confirmation regarding whether to prepare a reply email to an incoming email mentioned in the full duplex communication; and
upon user confirmation, presenting a draft reply email to the incoming email mentioned in the full duplex communication.

33. The electronic device of claim 18, wherein the action is to send the caller certain information in a text message, and the at least one parameter is a telephone number or email address of the caller, and wherein the prompt presents the user with an option to send a text message to the telephone number.

34. The electronic device of claim 18, wherein presenting the prompt further comprises:
presenting a user interface element for initiating a telephone call to a telephone number extracted from the full duplex communication, in addition to a user interface element for initiating a telephone call to a source telephone number from which the full duplex communication session originated.

35. A non-transitory computer-readable storage medium storing one or more programs for execution by the one or more processors, the one or more programs comprising instructions for:
while in a full duplex communication session between a caller and a user:
automatically, without user input:
extracting from the full duplex communication session a proposed action to be v by the user, wherein extracting the proposed action comprises determining the proposed action from a plurality of proposed actions, wherein the proposed actions include at least one of: calling back the caller, calling a person other than the caller, storing contact details in a contact book of the user, sending an email to the caller, sending a text message to the caller, visiting a webpage, watching an online video, recommending to download or purchase a software application, reminding to perform a task, performing a task, entering a calendar entry, attending a meeting, and navigating to a geographic location;
determining at least one action parameter for undertaking the action; and
presenting the user with a prompt to facilitate undertaking the action using the at least one parameter.

36. The non-transitory computer-readable storage medium of claim 35, wherein the extracting further comprises:
converting the full duplex communication from speech to text; and
extracting the action from the text.

37. The non-transitory computer-readable storage medium of claim 36, wherein the extracting further comprises extracting the action parameter from the text.

38. The non-transitory computer-readable storage medium of claim 35, wherein the action parameter is a source telephone number associated with the caller.

39. The non-transitory computer-readable storage medium of claim 38, wherein the source telephone number is obtained from a contact book of the user.

40. The non-transitory computer-readable storage medium of claim 38, wherein the source telephone number is obtained from caller identification.

41. The non-transitory computer-readable storage medium of claim 35, wherein the action is for the user to call back the caller, and the at least one action parameter comprises a name or telephone number of the caller, and wherein the prompt asks the user if they would like to call back the caller.

42. The non-transitory computer-readable storage medium of claim 35, wherein the action is for the user to call a person other than the caller, and the at least one action parameter comprises the name and telephone number of the person, and wherein the prompt asks the user if they would like to call back the person.

43. The non-transitory computer-readable storage medium of claim 35, wherein the at least one parameter includes a specific time period, and the presenting of the prompt occurs at or before the specific time period.

44. The non-transitory computer-readable storage medium of claim 35, wherein the action is to store contact details in a contact book of the user, and the at least one parameter comprises contact details.

45. The non-transitory computer-readable storage medium of claim 35, wherein the action is to check on an availability of the user, and the at least one parameter is retrieved from a calendar of the user.

46. The non-transitory computer-readable storage medium of claim 35, wherein the action is to send an email to the caller, and the at least one parameter is an email address of the caller, and wherein the prompt presents the user with an option to send an email message to the email address.

47. The non-transitory computer-readable storage medium of claim 46, wherein presenting the prompt further comprises:
   requesting user confirmation regarding whether to prepare an email to the email address; and
   upon user confirmation, presenting a draft email including the email address as a destination address and a transcript of the full duplex communication in a body of the draft email on the user device.

48. The non-transitory computer-readable storage medium of claim 46, the one or more programs further comprising instructions for:
   identifying an existing contact in a contact list associated with the user based on at least one of a source telephone number from which the full duplex communication originated and a name extracted from the full duplex communication, wherein the prompt offers to the user an option to store the email address extracted from the full duplex communication in association with the identified existing contact in the contact list.

49. The non-transitory computer-readable storage medium of claim 46, wherein presenting the prompt further comprises:
   requesting user confirmation regarding whether to prepare a reply email to an incoming email mentioned in the full duplex communication; and
   upon user confirmation, presenting a draft reply email to the incoming email mentioned in the full duplex communication.

50. The non-transitory computer-readable storage medium of claim 35, wherein the action is to send the caller certain information in a text message, and the at least one parameter is a telephone number or email address of the caller, and wherein the prompt presents the user with an option to send a text message to the telephone number.

51. The non-transitory computer-readable storage medium of claim 35, wherein presenting the prompt further comprises:
   presenting a user interface element for initiating a telephone call to a telephone number extracted from the full duplex communication, in addition to a user interface element for initiating a telephone call to a source telephone number from which the full duplex communication session originated.

* * * * *